(12) United States Patent
Zhang et al.

(10) Patent No.: US 11,143,230 B2
(45) Date of Patent: Oct. 12, 2021

(54) CENTERING FASTENER, MANUFACTURING METHOD AND USING METHOD THEREOF AND WIND TURBINE

(71) Applicant: BEIJING GOLDWIND SCIENCE & CREATION WINDPOWER EQUIPMENT CO., LTD., Beijing (CN)

(72) Inventors: Oujin Zhang, Beijing (CN); Xiao Zhang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 747 days.

(21) Appl. No.: 15/775,879

(22) PCT Filed: Jun. 8, 2017

(86) PCT No.: PCT/CN2017/087582
§ 371 (c)(1),
(2) Date: May 14, 2018

(87) PCT Pub. No.: WO2018/113204
PCT Pub. Date: Jun. 28, 2018

(65) Prior Publication Data
US 2020/0300286 A1 Sep. 24, 2020

(30) Foreign Application Priority Data

Dec. 23, 2016 (CN) .......................... 201611206479.X

(51) Int. Cl.
*F16B 35/04* (2006.01)
*F03D 1/06* (2006.01)
(Continued)

(52) U.S. Cl.
CPC .......... *F16B 35/041* (2013.01); *F03D 1/0675* (2013.01); *F16B 35/00* (2013.01);
(Continued)

(58) Field of Classification Search
CPC ...... F16B 5/0275; F16B 5/0283; F16B 35/00; F16B 35/041; F16B 35/042; F16B 35/06; F16B 43/00; F16B 35/04
(Continued)

(56) References Cited

U.S. PATENT DOCUMENTS 2,060,593 A * 11/1936 Schaurte ................ F16B 31/06
470/11
2,485,280 A * 10/1949 Grace .................... F16L 23/036
254/98
(Continued)

FOREIGN PATENT DOCUMENTS

| CN | 101311561 A | 11/2008 |
|----|-------------|---------|
| CN | 101918706 A | 12/2010 |

(Continued)

OTHER PUBLICATIONS

First Office Action issued in the counterpart Chinese application No. of 201611206479.X, mailed from the State Intellectual Property Office of China dated Feb. 26, 2018.
(Continued)

*Primary Examiner* — Roberta S Delisle
(74) *Attorney, Agent, or Firm* — Finnegan, Henderson, Farabow, Garrett & Dunner, LLP

(57) ABSTRACT

A centering fastener, a method for manufacturing the centering fastener, a method for using the centering fastener and a wind turbine are provided. The centering fastener includes a connecting body, a buffer lining and a centering member, the connecting body is a columnar body and includes a connecting portion and a non-threaded portion; the buffer
(Continued)

lining has a cylindrical shape and covers at least part of the non-threaded portion; the centering member covers an outer surface of the buffer lining, and, at least at a portion corresponding to the buffer lining, the non-threaded portion is separated from the centering member.

20 Claims, 2 Drawing Sheets

(51) Int. Cl.
    *F16B 35/06*     (2006.01)
    *F16B 35/00*     (2006.01)
    *B29L 31/08*     (2006.01)
    *F16B 43/00*     (2006.01)

(52) U.S. Cl.
    CPC ......... *F16B 35/06* (2013.01); *B29L 2031/085* (2013.01); *F03D 1/0658* (2013.01); *F05B 2260/301* (2013.01); *F05B 2280/6003* (2013.01); *F16B 35/04* (2013.01); *F16B 43/00* (2013.01)

(58) Field of Classification Search
    USPC .................................. 411/378, 383, 388–389
    See application file for complete search history.

(56) References Cited

U.S. PATENT DOCUMENTS

| | | | | |
|---|---|---|---|---|
| 3,204,586 | A * | 9/1965 | Marsh, Jr. | ............... F27D 1/021 |
| | | | | 52/584.1 |
| 3,408,887 | A * | 11/1968 | Villo | ................... B21D 45/006 |
| | | | | 83/140 |
| 4,732,519 | A | 3/1988 | Wagner | |
| 4,996,860 | A | 3/1991 | Shinjo | |
| 7,985,041 | B2 * | 7/2011 | Lin | ......................... F16B 37/00 |
| | | | | 411/427 |
| 8,112,843 | B2 | 2/2012 | Greiner et al. | |
| 8,545,182 | B2 | 10/2013 | Sørensen | |
| 8,672,557 | B2 | 3/2014 | Horling et al. | |
| 9,377,047 | B2 * | 6/2016 | Hill | ........................ F16B 5/0642 |
| 10,151,337 | B2 * | 12/2018 | Hill | ........................ F16B 21/00 |
| 10,907,680 | B2 * | 2/2021 | Hill | ........................ F16B 21/00 |
| 2008/0293501 | A1 | 11/2008 | Greiner et al. | |
| 2009/0092462 | A1 * | 4/2009 | Pratt | ....................... F16B 35/06 |
| | | | | 411/368 |
| 2011/0038577 | A1 | 2/2011 | Horling et al. | |
| 2011/0038683 | A1 * | 2/2011 | Ito | ......................... F16B 13/066 |
| | | | | 411/16 |
| 2014/0348656 | A1 * | 11/2014 | Huang | .................... F03D 80/30 |
| | | | | 416/146 R |

FOREIGN PATENT DOCUMENTS

| | | |
|---|---|---|
| CN | 101932838 A | 12/2010 |
| CN | 102454677 A | 5/2012 |
| CN | 203516382 U | 4/2014 |
| CN | 205260540 U | 5/2016 |
| CN | 205780180 U | 12/2016 |
| CN | 106640903 A | 5/2017 |
| EP | 0747538 A1 | 12/1996 |
| JP | H 07189427 A | 7/1995 |
| JP | 08334113 A | 12/1996 |

OTHER PUBLICATIONS

International Search Report issued in International Application No. PCT/CN2017/087582, mailed from the State Intellectual Property Office of China dated Sep. 28, 2017.

* cited by examiner

CENTERING FASTENER, MANUFACTURING METHOD AND USING METHOD THEREOF AND WIND TURBINE

CROSS-REFERENCE TO RELATED APPLICATIONS

This application is the national phase of International Application No. PCT/CN2017/087582, titled "CENTERING FASTENER, MANUFACTURING METHOD AND USING METHOD THEREOF AND WIND TURBINE", filed on Jun. 8, 2017, which claims the benefit of priority to Chinese Patent Application No. 201611206479.X titled "CENTERING FASTENER, MANUFACTURING METHOD AND USING METHOD THEREOF AND WIND TURBINE", filed with the Chinese State Intellectual Property Office on Dec. 23, 2016, the content of which are incorporated herein by reference in their entirety.

FIELD

This application relates to the technical field of fastener connection, in particular to a centering fastener, a method for manufacturing the centering fastener, a method for using the centering fastener and a wind turbine.

BACKGROUND

A fastener, as a universal connector, is usually installed in mounting holes of connected components, and is required to have a certain strength to withstand damages from external forces. In a wind turbine, a bolt (or a stud), as a main connecting fastener, plays an important role in positioning and connecting, and its strength directly affects the stability and reliability of the wind turbine. When the wind turbine is in operation, due to the complicated working conditions, the connecting bolts (or studs) between key large-size parts are loaded complicatedly and are subjected to large variable loads, this requires the bolts (or studs) to have high fatigue strength. Generally, a large number of high-strength connecting bolts are evenly distributed around these connected components, for example, the high-strength connecting bolts are used for connection between tower segments, connection between a yaw bearing and a base, connection between a pitch bearing and a hub and connection of blades. However, when bolt (or stud) mounting holes of these connected components are not accurately positioned, threaded portions of the bolts (studs) will be in contact with the mounting holes. If the mounting holes of the connected components are misaligned from each other seriously, these connected fasteners will be bent and deformed, bending stress will be generated and the fatigue performance of the bolts (studs) will be reduced. Therefore, connecting fasteners such as bolts (studs) are also required to have a good positioning function, the usual practice is to produce a structure having a varied cross-section as a positioning segment on the connecting body, however, stress concentration is apt to be presented at the joint of this one-piece structure, and in fact, there is still shearing stress at the joint due to the misalignment error, which may cause indentation on the positioning segment and may even crush the connecting body of the bolt (stud), to adversely affect the fatigue strength of the connecting fastener and thereby reducing the stability and reliability of the wind turbine.

In practice, the failure (or breakage) of connecting fasteners such as bolts (or studs) is the main form of failures of the wind turbine, and the design and mounting issues of these fasteners are important causes of their failures. Therefore, it is necessary to provide a centering fastener, a method for manufacturing the centering fastener, a method for using the centering fastener and a wind turbine.

SUMMARY

A centering fastener, a method for manufacturing the centering fastener, a method for using the centering fastener and a wind turbine are provided according to embodiments of the present application, which can address the issue of fatigue failure of the centering fastener due to stress concentration at a positioning and connecting portion.

A centering fastener is provided according to a first aspect of the present application, which includes: a connecting body, a buffer lining and a centering member, the connecting body is a columnar body and includes a connecting portion and a non-threaded portion; the buffer lining has a cylindrical shape and coats at least part of the non-threaded portion; the centering member coats an outer surface of the buffer lining, and, at least at a portion corresponding to the buffer lining, the non-threaded portion is separated from the centering member.

In a first possible embodiment, the centering member is a cylindrical tubular structure having a smooth surface.

In combination with the above possible embodiments, in a second possible embodiment, an end of the centering member is tapered to form a conical guide portion having an inclined surface, and the inclined surface extends to an outer surface of the non-threaded portion.

In combination with the above possible embodiments, in a third possible embodiment, the centering member has a strength greater than or equal to a strength of the connecting body.

In combination with the above possible embodiments, in a fourth possible embodiment, the centering member is a cylindrical tubular structure formed by winding a fiber reinforced resin matrix composite material.

In combination with the above possible embodiments, in a fifth possible embodiment, the fiber reinforced resin matrix composite material includes a glass fiber reinforced plastic or a carbon fiber reinforced plastic.

In combination with the above possible embodiments, in a sixth possible embodiment, the buffer lining has an elasticity greater than an elasticity of the connecting body and/or an elasticity of the centering member.

In combination with the above possible embodiments, in a seventh possible embodiment, the buffer lining is made of spring steel, rubber, leather or organic fibers.

In combination with the above possible embodiments, in an eighth possible embodiment, the connecting body is a bolt, the connecting portion has a threaded structure, and the centering member has an outer diameter greater than an outer diameter of the threaded structure.

In combination with the above possible embodiments, in a ninth possible embodiment, the bolt is a double-ended bolt with the threaded structure at each of both ends and the non-threaded portion at the middle, and the non-threaded portion has a diameter less than the outer diameter of the threaded structure.

In a second aspect, a method for manufacturing the centering fastener according to any one of the above embodiments is provided, which includes:

coating the buffer lining on at least part of an outer surface of the non-threaded portion; and coating and forming the centering member on the outer surface of the buffer lining.

In a first possible embodiment, the coating the buffer lining on at least part of the outer surface of the non-threaded portion includes: coating a material, including spring steel, rubber, leather, or organic fibers, on the outer surface of the non-threaded portion.

In combination with the above possible embodiments, in a second possible embodiment, the coating and forming the centering member on the outer surface of the buffer lining includes:

impregnating glass fibers or carbon fibers with a resin;

winding the resin-impregnated glass fibers or resin-impregnated carbon fibers on the outer surface of the buffer lining to form a cylindrical tubular structure;

machining the cylindrical tubular structure, being cured, into a cylindrical tubular centering member having a smooth surface; and machining a conical inclined surface at each of two ends of the cylindrical tubular centering member, to allow the cylindrical tubular centering member to have a gradually decreased diameter at parts close to end surfaces.

In combination with the above possible embodiments, in a third possible embodiment, the winding the resin-impregnated glass fibers or the resin-impregnated carbon fibers on the outer surface of the buffer lining to form the cylindrical structure includes: winding the resin-impregnated glass fibers or the resin-impregnated carbon fibers to form a reticulated fiber structure in a staggered manner.

In a third aspect, a method for using a centering fastener is provided, and the centering fastener is the centering fastener according to any one of the embodiments of the first aspect, the method includes mounting the centering fastener in mounting holes of components to be connection in a clearance fit, to allow the buffer lining to be located at a joint between the components to be connected.

In a fourth aspect, a wind turbine is provided, which includes the centering fastener according to any one of the embodiments of the first aspect, and the centering fastener is configured to connect components of the wind turbine. Two or more of the centering fasteners are uniformly arranged at a joint of each group of components to be connected, and each of the centering fasteners is mounted in respective mounting holes of the components to be connected, to allow the buffer lining to be located at the joint. The components to be connected include a base, a tower, a yaw bearing, a pitch bearing, a hub and a blade.

In summary, in the centering fastener according to the present application, the non-threaded portion of the connecting body is separated from the centering member by the buffer lining at the middle layer, to form a layered positioning connection structure by the centering member, the buffer lining and the connecting body arranged from outside to inside, and the external force subjected by the positioning segment of the centering fastener at the joint is also reduced layer by layer from outside to inside. Thus, while achieving the positioning and connecting function, the connecting body is protected, which effectively addresses the issue of fatigue failure of the connecting body due to stress concentration.

Figure 1:
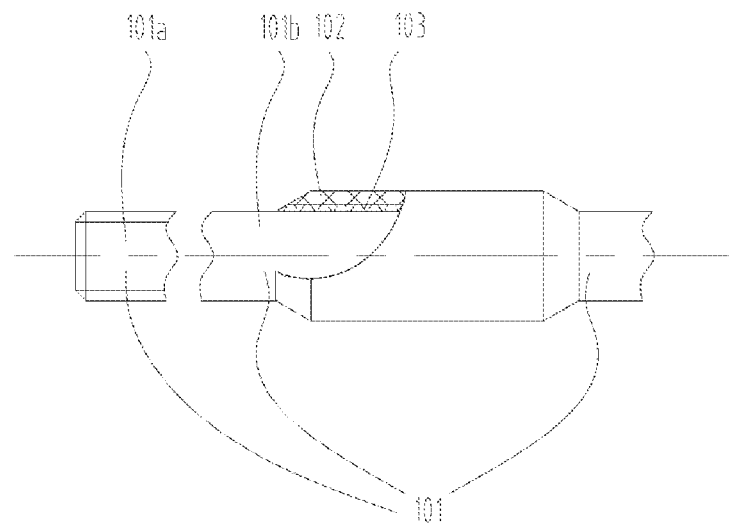
FIG. 1 is a partially sectional view of a centering fastener according to some embodiments of the present application.

Reference Numerals in the drawings:

| | |
|---|---|
| 1: double-ended bolt, | 2: pitch bearing, |
| 3: hub, | 101: connecting body, |
| 102: centering member, | 103: buffer lining, |
| 101a: connecting portion, | 101b: non-threaded portion. |

DETAILED DESCRIPTION

In order to make the objects, technical solutions and advantages of the embodiments of the present application clearer, the technical solutions in the embodiments of the present application are clearly and completely described hereinafter with reference to the drawings in the embodiments of the present application. Obviously, the embodiments described in the present application are a part of the embodiments, rather than all of the embodiments. All other embodiments obtained by the person skilled in the art based on the embodiments of the present application without creative efforts shall fall within the scope of protection of the present application.

FIG. 1 is a partial schematic view of a centering fastener according to some embodiments of the present application.

With reference to FIG. 1, the centering fastener in this embodiment can be used for the positioning and connection between components to be connected. The centering fastener includes a connecting body 101, a buffer lining 103 and a centering member 102. The connecting body 101 is a columnar body, including a connecting portion 101a and a non-threaded portion 101b. The buffer lining 103 has a tubular shape and coats at least part of the non-threaded portion 101b. The centering member 102 coats an outer surface of the buffer lining 103 and has a tubular structure. The non-threaded portion 101b is separated from the centering member 102 at least at the portion corresponding to the buffer lining 103. The connecting portion 101a achieves the fastening and connecting effect. The non-threaded portion 101b coated by the centering member 102 and the buffer lining 103 achieves the positioning effect. The buffer lining 103 and the centering member 102 are provided at the non-threaded portion 101b of the connecting body 101 sequentially in an outward direction, and the buffer lining 103 separates the connecting body 101 from the centering member 102. When the connected components generate a shearing force on the connecting body 101 due to a misalignment error, the shearing force is transmitted inwards to the buffer lining 103 by the centering member 102 and thus is reduced. When the shearing force is transmitted to the non-threaded portion 101b of the connecting body 101, the force subjected by the connecting body 101 is greatly reduced, and the stress concentration of the connecting body 101 at the joint can be effectively reduced, and the fatigue strength of the connecting fastener is improved to a certain degree, thereby protecting the connecting body 101.

Thus, the centering fastener according to the present application forms a layered positioning and connecting structure through the centering member 102, the buffer lining 103 and the connecting body 101 arranged from outside to inside, and the external force subjected by the centering fastener at the joint is also reduced accordingly from outside to inside. Compared with the integrated structure in the conventional technology, the centering fastener according to the present application can not only achieve the function of positioning and connecting, but also effectively address the issues of fatigue failure and breakage of the connecting body 101 of the fastener caused by stress concentration at the joint.

The centering member 102 is a cylindrical tubular structure having a smooth surface. Since the mounting holes are generally circular, the centering member 102 is designed to have the cylindrical tubular structure so as to be better matched with the mounting holes and mounted to the mounting holes. The smooth surface allows the force applied on the centering member 102 to be uniform, avoids the stress concentration caused by a rough surface, and the centering member 102 having the smooth surface may have a small friction force when being in contact with the mounting holes, which facilitates the guiding, mounting and detaching. In addition, the outer diameter of the centering member 102 is configured to match the inner diameters of the mounting holes so as to enable the centering effect of the mounting holes.

An end of the centering member 102 is tapered into a conical guide portion having an inclined surface, and the inclined surface extends to the outer surface of the non-threaded portion 101b. The conical guide portion has a guiding function. The inclined surface of the guide portion extends to the outer surface of the non-threaded portion 101b to form a good transition and guide structure, which further enhances the guiding effect, and also facilitates the machining, mounting and detaching.

Figure 1A:
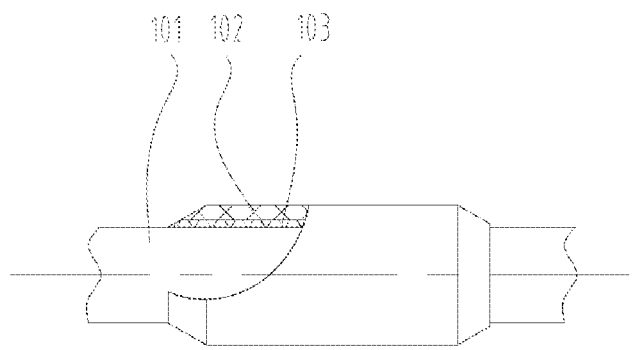
FIGS. 1a and 1b are schematic views of conical guide portions according to various embodiments of the present application respectively.
Figure 1B:
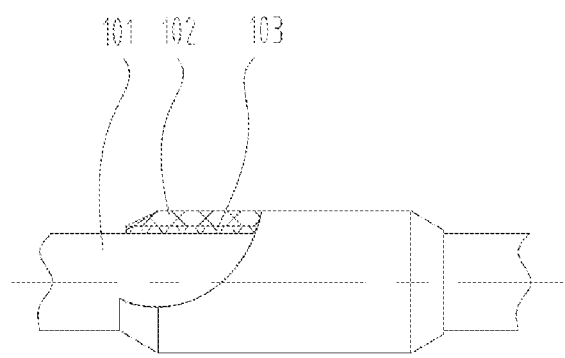

It is to be noted that, in this embodiment as a preferred embodiment, referring to FIG. 1a, the inclined surface of the conical guide portion extends to the outer surface of the non-threaded portion 101b to form a good transition and guide structure. In another variation, referring to FIG. 1b, the conical guide surface of the centering member 102 may also be completely separated from the connecting body 101, and in this case, the inclined surface of the conical guide portion of the centering member 102 extends to the buffer lining 103 rather than extending to the non-threaded portion 101b, and this variation is also within the scope of the technical solution of the present application as long as the connecting body 101 and the centering member 102 are at least partially separated from each other by the buffer lining 103.

The centering member 102 has a strength greater than or equal to the strength of the connecting body 101. Since the centering member 102 will directly contact the connected components at the joint, it will bear the maximum force. If the centering member 102 has an insufficient strength, it may have a poor capability of resisting the damages from external forces, and is apt to fail when subjected to an excessive force. Therefore, the centering member 102 has a sufficient strength to resist the damages at the joint, and can better function to position, guide and protect the connecting body 101.

Optionally, the centering member 102 is a cylindrical tubular structure formed by winding a fiber reinforced resin matrix composite material. The fiber reinforced resin matrix composite material has many mechanical property advantages such as a high specific strength, a high specific stiffness, a low density, being fatigue resistant and corrosion resistant compared with conventional materials, and can meet the requirements such as high strength of the centering member 102 to resist the damages from the external forces.

Further, the fiber reinforced resin matrix composite material includes a glass fiber reinforced resin matrix composite material or a carbon fiber reinforced resin matrix composite material such as a glass fiber reinforced plastic, a carbon fiber reinforced plastic and the like. Among them, the glass fiber reinforced resin matrix composite material or the carbon fiber reinforced resin matrix composite material have advantages such as having a light weight, a high strength, being fatigue resistant and corrosion resistant.

The buffer lining 103 has a greater elasticity than the connecting body 101 and/or the centering member 102. The buffer lining 103 has a good elasticity, thus it can effectively absorb part of the pressure transmitted from the centering member 102. In the case that the buffer lining 103 has a greater elasticity than the connecting body 101 and the centering member 102, the pressure absorbing effect is better, and the force subjected by the non-threaded portion 101b of the connecting body 101 can be reduced, and the connecting body 101 can be further prevented from fatigue failure when subjected to a too large pressure.

The buffer lining 103 is made of spring steel, rubber, leather or organic fibers, and generally, the spring steel, rubber, leather or organic fibers have a good elasticity and can effectively absorb the force transmitted to the connecting body 101 from the connected components via the centering member 102, thereby reducing the force applied on the connecting body 101 and effectively protecting the connecting body 101. It is to be noted that, in practical implementations, the material of the buffer lining 103 is not limited to the materials listed in the present application, and other equivalent replacement materials which can be conceived by the person skilled in the art are all within the technical scope of the present application as long as they enable the buffer lining 103 to separate the connecting body 101 from the centering member 102 while having the force absorbing effect to reduce the force applied on the connecting body 101.

It is to be noted that, the connecting body 101 of the centering fastener according to the present application may be a bolt, a stud, a pin, and etc., as long as the fasteners are capable of positioning and connecting the components to be connected, the connecting body 101 of the centering fastener according to the present application can be implemented by the fasteners within the scope and principle of technical solutions of the present application.

Figure 2:
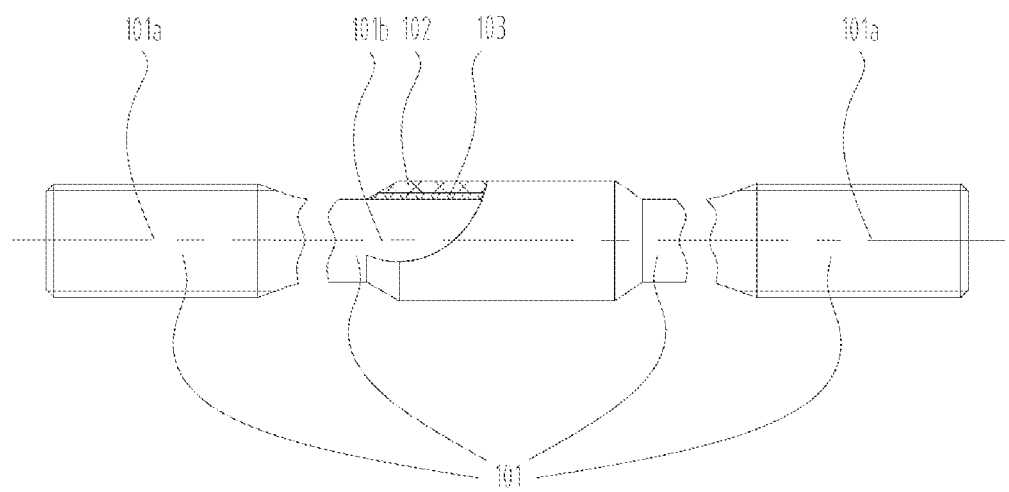
FIG. 2 is a partially sectional view showing the structure of a centering fastener according to further embodiments of the present application.

FIG. 2 is a schematic view showing the structure of a centering fastener according to further embodiments of the present application.

According to some embodiments of the present application, the connecting body 101 is embodied as a bolt, i.e., the centering fastener may be understood as a positioning bolt, and a connecting portion 101a of the bolt has a threaded structure, the centering member 102 has an outer diameter greater than an outer diameter of the threaded structure, at least a part of the non-threaded portion 101b of the connecting body 101 of the bolt is coated with the buffer lining 103 and the centering member 102 from inside to outside to form a centering guide structure. The positioning and connecting effect will be improved accordingly as the gap between the mounting hole and the centering guide structure in a fitted state gets smaller, and the mounting hole is designed according to the size of the connecting fastener. To realize the connection, it is required that the threaded portion can pass through the mounting hole, that is, the diameter of the mounting hole is required to be greater than that of the threaded hole, and in order to achieve a better positioning connection effect at the connecting portion, the centering member 102 is designed to have an outer diameter less than but approximate to the diameter of the mounting hole as far as possible. Therefore, the centering member according to the present application has an outer diameter greater than the outer diameter of the threaded structure, and thus realizing the best positioning connection effect.

As a feasible embodiment, the bolt according to the present application is a double-ended bolt 1 having threaded structures at both two ends and a non-threaded portion 101b at the middle. The non-threaded portion 101b has a diameter less than the outer diameter of the threaded structure. The centering fasteners of the double-ended bolt 1 having a thin and long neck can be used for the connection of larger components, for example for the connection between the key components in wind turbine equipment, which can effectively improve the reliability of the equipment compared with the conventional technology.

In a second aspect, a method for manufacturing the centering fastener according to the above embodiments is provided according to the present application, which includes: coating a buffer lining 103 on an outer surface of at least a part of a non-threaded portion 101b; and coating and forming a centering member 102 on an outer surface of the buffer lining 103. Generally, the buffer lining 103 is a thin tubular structure with a thickness ranging from 0.5 mm to 1 mm, which can achieve the purpose of buffering without reducing the overall hardness. The specific thickness can be designed according to the specifications of the connecting body 101 (such as a bolt).

In manufacturing, the method for coating the buffer lining 103 on the outer surface of the non-threaded portion 101b includes coating a material, such as spring steel, rubber, leather, or organic fibers, on the outer surface of the non-threaded portion 101b. The material can be easily obtained, has a low cost, and can meet the requirement of a high elasticity imposed on the buffer lining 103.

Further, a method for coating and forming the centering member 102 on the outer surface of the buffer lining 103 includes: first, impregnating glass fibers or carbon fibers with a resin; then winding the resin-impregnated glass fibers or carbon fibers on the outer surface of the buffer lining 103 to form a cylindrical tubular structure; then machining the cured cylindrical tubular structure into a cylindrical tubular centering member 102 having a smooth surface; and last, machining a conical guide portion at each of two ends of the cylindrical tubular centering member 102, to allow the centering member 102 to have a gradually decreased diameter at parts close to end surfaces. In the specific manufacturing process, the fiber reinforced resin winding technique equipment can be used. In the curing process, the curing can be performed spontaneously or can be speeded up by measures such as heating or ventilation. Lastly, in the process of machining the surface of the work blank of the cured centering member 102, machining processes, such as turning and milling, can be performed by a machine tool, to obtain a centering member 102 that meets predetermined diameter and surface requirements.

Further, the winding method includes winding the resin-impregnated glass fibers or carbon fibers to form a reticulated fiber structure in a staggered manner, and specifically, the reticulated fiber structure can be formed by winding the resin-impregnated glass fibers or carbon fibers in a staggered pattern of a FIG. 8, and thereby a centering member 102 having a higher strength and stability can be obtained.

In a third aspect, a method of using a centering fastener is further provided according to the present application, in which the centering fastener according to the embodiments of the first aspect of the present application is employed. The centering fastener is mounted in the mounting holes of the components to be connected in a clearance fit, to allow the buffer lining 103 to be located at the joint between the connected components. The installation with the clearance fit may facilitate mounting and detaching, especially in large equipment, it is required to use a large number of connecting fasteners such as bolts and studs, and the easy mounting and detaching manner can improve the working efficiency to a great extent. In addition, the buffer lining 103 is located at the joint, thus can buffer the force from the connected components, to achieve the effect of protecting the connecting body 101.

Figure 3:
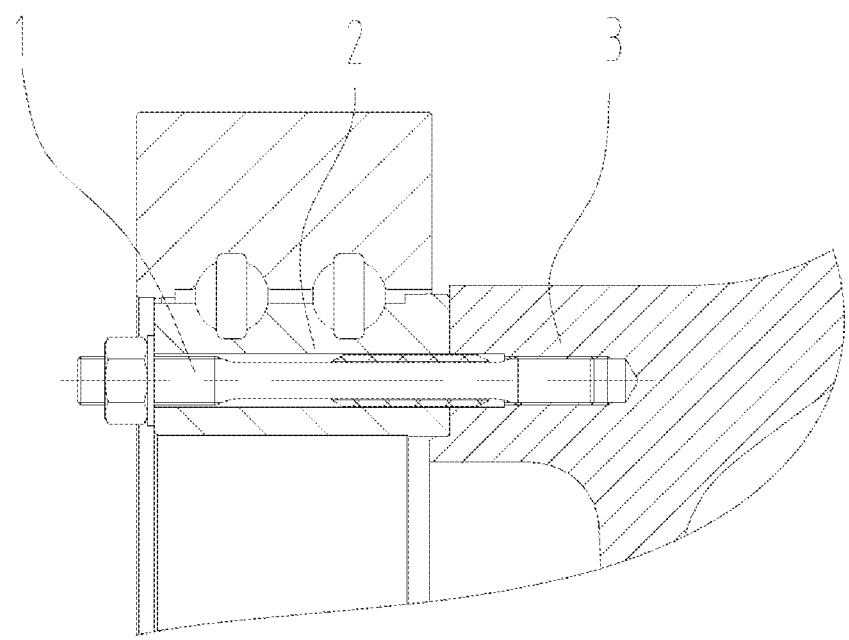
FIG. 3 is a schematic view showing the connection between a pitch bearing and a hub in a wind turbine according to an embodiment of the present application.

In a fourth aspect, a wind turbine is provided. Referring to FIG. 3, the wind turbine includes the centering fastener according to the embodiments of the first aspect which uses a bolt as the connecting body 101, and the centering fastener is used for connection of the components to be connected such as a base, a tower, a yaw bearing, a pitch bearing, a hub, and blades. Specifically, the joint of each group of components to be connected is evenly distributed with two or more centering fasteners according to the present application, and each of the centering fasteners is mounted in respective mounting holes of the components to be connected, and the buffer lining is located at the joint.

Referring to FIG. 3, the connection between the pitch bearing 2 and the hub 3 is illustrated as an example, a double-ended bolt 1 having a thin long neck according to the above embodiments is employed as a connecting fastener between the pitch bearing 2 and the hub 3. The pitch bearing 2 and the hub 3 each has a large thickness, thus such double-ended bolt 1 having a thin long neck is employed accordingly, which can better achieve the positioning and connecting function. The centering member 102, the buffer lining 103 and the connecting body 101 of the bolt 1 arranged from outside to inside form a layered positioning connection structure, and the external force subjected by the bolt 1 at the joint between the pitch bearing 2 and the hub 3 also decreases layer by layer from outside to inside, which not only achieves a better positioning and connecting effect, but also effectively addresses the issues of fatigue failure and breakage of the connecting body 101 of the bolt 1 at the joint due to stress concentration.

It is to be noted that, as an example, the double-ended bolt 1 with the thin long neck is used for connection between the pitch bearing 2 and the hub 3 in FIG. 3. In the wind turbine according to the present application, the centering fastener having different forms of connecting body 1 can be used for connection between other components according to practical situations, and reference may be made to FIG. 3 for the specific operation, which will not be described here.

Due to the complex force applied on the joint between the key large components in the wind turbine, the connecting fasteners such as bolts (or studs) are subjected to large forces, and generally, high-strength bolts (or studs) are adopted. Therefore, in the case that the centering fastener according to the present application is employed, since the buffer lining 103 with a good elasticity separates the connecting body 101 from the centering member 102, the connecting fastener can weaken the force applied on the connecting body 101 at the joint while realizing the positioning and connecting function, which effectively addresses the issue of fatigue failure of the connecting body 101 due to stress concentration caused by the misalignment error of the connected components. Compared with the conventional technology, the wind turbine has a higher stability and a higher reliability to a certain extent, and according to some embodiments, by simply distributing two to three of the centering fasteners according to the present application at the joint evenly, the function of positioning may just be achieved, thereby reducing the shearing force generated from the misalignment error of the mounting holes and relieving the issue of fatigue failure of the bolt in the conventional technology, and conventional high-strength bolts can still be used in other connecting holes for connection, thereby achieving a high mechanical property and reducing an economic cost.

It is to be noted that, the fastener, as a universal connector, is used by being mounted in the mounting holes of the components to be connected, and the embodiments of the present application schematically illustrate the fastener by taking a general fastener and a thin-necked double-ended bolt as examples, however, the fastener is not limited to the forms of fasteners in the embodiments, but may also be the centering fastener which uses other types of connecting body such as bolts, studs or pins and etc., which are all within the scope of protection of the technical solutions of the present application. In large-size equipment, especially the wind turbine, if applying the principle of the solution of the centering fastener according to the present application in the high-strength connecting bolts, the issue of failure of the wind turbine caused by the fatigue failure of the bolts resulted from the drawbacks in design and installation errors in the conventional technology can be addressed.

As described above, in the centering fastener according to the present application, the connecting body 101 at the innermost layer is separated from the centering member 102 at the outermost layer by the buffer lining 103 at the intermediate layer, to form a layered centering guide structure having "hard-soft-hard" layers. When the connected components apply a shearing force on the connecting body 101 at the joint due to misalignment errors, and the shearing force is transmitted to the buffer lining 103 from the centering member 102, the shearing force is reduced by the buffer lining, and when the shearing force is transmitted to the connecting body 101, it is further significantly reduced, such that the force applied to the connecting body 101 is reduced, which achieves the effect of protecting the connecting body 101. The centering fastener according to the present application, while achieving the positioning and connecting function, can also effectively address the issue of fatigue failure of the connecting body when receiving a too large external force, moreover, it has advantages of having a simple structure, a high economic efficiency and a wide application range, and being easy to mount and detach.

Although the present application has been described with reference to preferred embodiments, various improvements may be made thereto and components thereof may be substituted by equivalents without departing from the scope of the present application. In particular, as long as there is no structural conflict, the various technical features mentioned in the various embodiments may be combined in any way. The present application is not limited to the specific embodiments disclosed herein, but includes all technical solutions falling within the scope of the claims.

What is claimed is:

1. A centering fastener, comprising:
    a connecting body being a columnar body and comprising a connecting portion and a non-threaded portion;
    a buffer lining having a cylindrical shape and coating at least part of the non-threaded portion; and
    a centering member having a tubular structure and coating an outer surface of the buffer lining;
    wherein the non-threaded portion is separated from the centering member at least at a portion corresponding to the buffer lining.

2. The centering fastener according to claim 1, wherein the tubular structure is cylindrical and has a smooth surface.

3. The centering fastener according to claim 2, wherein an end of the centering member is tapered to form a conical guide portion having an inclined surface, and the inclined surface extends to an outer surface of the non-threaded portion.

4. The centering fastener according to claim 3, wherein the connecting body is a bolt, the connecting portion has a threaded structure, and the centering member has an outer diameter greater than an outer diameter of the threaded structure.

5. The centering fastener according to claim 2, wherein the connecting body is a bolt, the connecting portion has a threaded structure, and the centering member has an outer diameter greater than an outer diameter of the threaded structure.

6. The centering fastener according to claim 1, wherein the centering member has a strength greater than or equal to a strength of the connecting body.

7. The centering fastener according to claim 6, wherein the tubular structure is cylindrical and formed by winding a fiber reinforced resin matrix composite material.

8. The centering fastener according to claim 7, wherein the fiber reinforced resin matrix composite material comprises a glass fiber reinforced plastic or a carbon fiber reinforced plastic.

9. The centering fastener according to claim 6, wherein the connecting body is a bolt, the connecting portion has a threaded structure, and the centering member has an outer diameter greater than an outer diameter of the threaded structure.

10. The centering fastener according to claim 1, wherein the buffer lining has an elasticity greater than an elasticity of the connecting body and/or an elasticity of the centering member.

11. The centering fastener according to claim 10, wherein the buffer lining is made of spring steel, rubber, leather or organic fibers.

12. The centering fastener according to claim 1, wherein the connecting body is a bolt, the connecting portion has a threaded structure, and the centering member has an outer diameter greater than an outer diameter of the threaded structure.

13. The centering fastener according to claim 12, wherein the bolt is a double-ended bolt with the threaded structure at each of two ends and the non-threaded portion at the middle, and the non-threaded portion has a diameter less than the outer diameter of the threaded structure.

14. A method for manufacturing the centering fastener according to claim 1, comprising:
    coating the buffer lining on at least part of an outer surface of the non-threaded portion; and
    coating and forming the centering member on the outer surface of the buffer lining.

15. The method for manufacturing the centering fastener according to claim 14, wherein the coating the buffer lining on at least part of the outer surface of the non-threaded portion comprises:
    coating a material, including spring steel, rubber, leather or organic fibers, on the outer surface of the non-threaded portion.

16. The method for manufacturing the centering fastener according to claim 14, wherein the coating and forming the centering member on the outer surface of the buffer lining comprises:

impregnating glass fibers or carbon fibers with a resin;

winding the resin-impregnated glass fibers or resin-impregnated carbon fibers on the outer surface of the buffer lining to form the tubular structure;

machining the tubular structure, being cured, into a cylindrical tubular centering member having a smooth surface; and machining a conical guide portion at each of two ends of the tubular centering member to allow the centering member to have a gradually decreased diameter at parts close to end surfaces.

17. The method for manufacturing the centering fastener according to claim 16, wherein the winding the resin-impregnated glass fibers or the resin-impregnated carbon fibers on the outer surface of the buffer lining to form the tubular structure comprises:

winding the resin-impregnated glass fibers or the resin-impregnated carbon fibers to form a reticulated fiber structure in a staggered manner.

18. A method for using a centering fastener, wherein the centering fastener is the centering fastener according to claim 1, and the method comprises:

mounting the centering fastener in mounting holes of components to be connection in a clearance fit, to allow the buffer lining to be located at a joint between the components to be connected.

19. A wind turbine, comprising the centering fastener according to claim 1, and the centering fastener being configured to connect components of the wind turbine, wherein two or more of the centering fasteners are uniformly arranged at a joint of each group of components to be connected, and each of the centering fasteners is mounted in respective mounting holes of the components to be connected, to allow the buffer lining to be located at the joint.

20. The wind turbine according to claim 19, wherein the components to be connected comprise a base, a tower, a yaw bearing, a pitch bearing, a hub and a blade.

* * * * *